United States Patent
Kimura (10) Patent No.: US 8,358,451 B2
(45) Date of Patent: Jan. 22, 2013

(54) IMAGE READING APPARATUS AND IMAGE READING SYSTEM

(75) Inventor: Keisuke Kimura, Ishikawa (JP)

(73) Assignee: PFU Limited, Ishikawa (JP)

(*) Notice: Subject to any disclaimer, the term of this patent is extended or adjusted under 35 U.S.C. 154(b) by 386 days.

(21) Appl. No.: 12/825,397

(22) Filed: Jun. 29, 2010

(65) Prior Publication Data

US 2011/0170149 A1 Jul. 14, 2011

(30) Foreign Application Priority Data

Jan. 14, 2010 (JP) ................. 2010-006265

(51) Int. Cl.
*H04N 1/04* (2006.01)
(52) U.S. Cl. ......... 358/498; 358/496; 358/474; 358/408
(58) Field of Classification Search .............. 358/498, 358/496, 474, 408
See application file for complete search history.

(56) References Cited

U.S. PATENT DOCUMENTS

2007/0095917 A1  5/2007  van Os

FOREIGN PATENT DOCUMENTS

| JP | 2006-197179 | * | 7/2006 |
| JP | 2008189434 A | | 8/2008 |
| JP | 2009143696 A | | 7/2009 |

\* cited by examiner

*Primary Examiner* — Houshang Safaipour
(74) *Attorney, Agent, or Firm* — Lowe Hauptman Ham & Berner, LLP (57) ABSTRACT

A conveying device, comprising: a linear conveyance route on which a sheet-like medium is linearly conveyable; a bent conveyance route that is branched from the linear conveyance route and on which the medium is conveyable in a bent manner; a switching member provided at the branched portion and movable into a bent conveyance position for guiding the medium to the bent conveyance route and into a linear conveyance position for guiding the medium to the linear conveyance route, according to a force acting from the medium at a time of coming in contact with the medium; and a variable pressurizing unit configured to make a force acting on the medium from the switching member in the linear conveyance position smaller than a force acting on the medium from the switching member in the bent conveyance position.

6 Claims, 10 Drawing Sheets

IMAGE READING APPARATUS AND IMAGE READING SYSTEM

CROSS-REFERENCE TO RELATED APPLICATIONS

This application is based upon and claims the benefit of priority from Japanese Patent Application No. 2010-006265, filed Jan. 14, 2010, the entire contents of which are incorporated herein by reference.

BACKGROUND OF THE INVENTION

1. Field of the Invention

The present invention relates to a conveying device and an image reading apparatus.

2. Description of the Related Art

Conventional conveying devices that convey sheet-like media such as sheets of paper and conventional image reading apparatuses that read images on the media conveyed by the conveying devices are disclosed in Japanese Laid-open Patent Publication No. 2008-189434, which discloses a sheet conveying device and an image reading apparatus that have different conveying speeds for objects to be conveyed by switching conveyance paths depending on rigidities of the objects, and in Japanese Laid-open Patent Publication No. 2009-143696, which discloses an original conveying device that changes a gap between a conveying roller and a driven roller based on a thickness of an original and switches a paper ejection path of the original, and in United States Patent Application No. 2007/0095917, which discloses a scanner that is able to switch between conveyance for a document and conveyance for a card.

For the sheet conveying device and the image reading apparatus disclosed in Japanese Laid-open Patent Publication No. 2008-189434, the original conveying device disclosed in Japanese Laid-open Patent Publication No. 2009-143696, and the scanner disclosed in U.S. patent application Ser. No. 07/009,5917, it has been desired to convey plural kinds of media properly with a simple configuration, for example.

SUMMARY OF THE INVENTION

It is an object of the present invention to at least partially solve the problems in the conventional technology.

According to an aspect of the present invention, a conveying device includes: a linear conveyance route on which a sheet-like medium is linearly conveyable; a bent conveyance route that is branched from the linear conveyance route and on which the medium is conveyable in a bent manner; a switching member provided at the branched portion and movable into a bent conveyance position for guiding the medium to the bent conveyance route and into a linear conveyance position for guiding the medium to the linear conveyance route, according to a force acting from the medium at a time of coming in contact with the medium; and a variable pressurizing unit configured to make a force acting on the medium from the switching member in the linear conveyance position smaller than a force acting on the medium from the switching member in the bent conveyance position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a conveying device and an image reading apparatus according to the present invention will be explained below in detail with reference to the accompanying drawings. The present invention is not limited to the embodiments. In addition, structural elements in the following embodiments include elements easily replaceable by those skilled in the art, or substantially the same elements.

Figure 1:
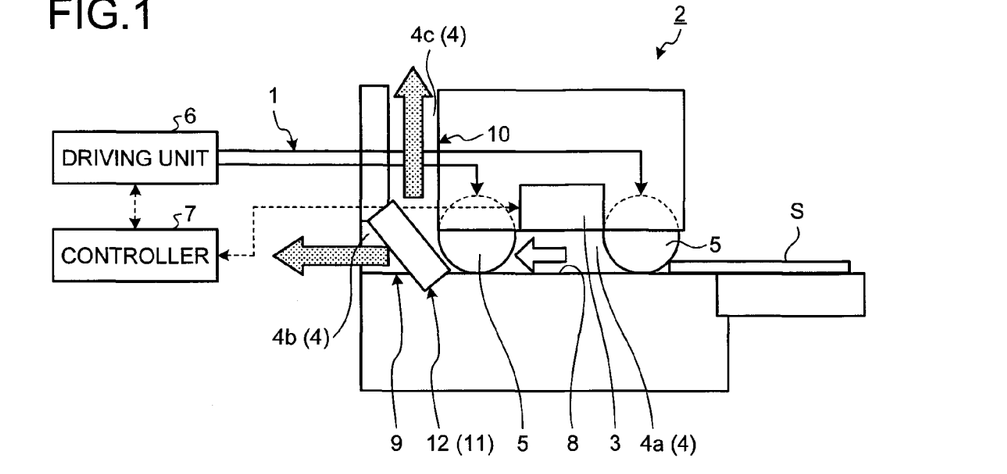
FIG. 1 is a schematic configuration diagram of a configuration example of an image reading apparatus according to a first embodiment.
Figure 2:
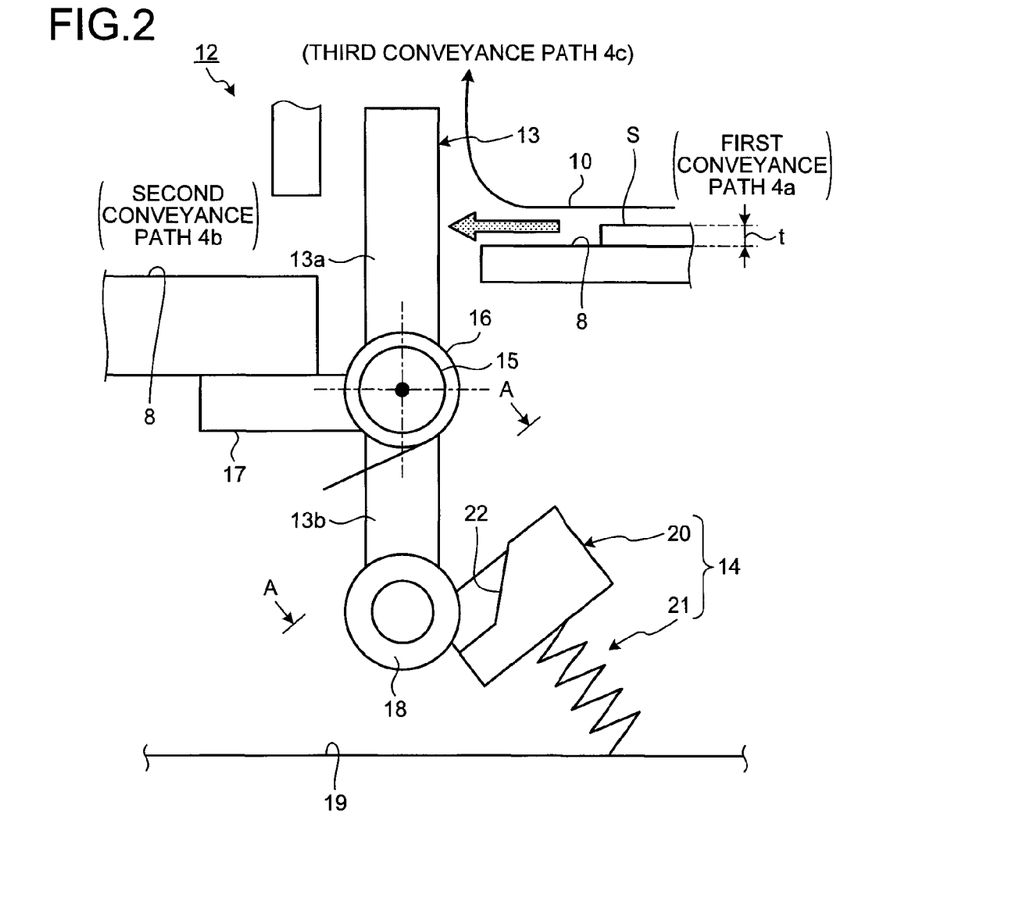
FIG. 2 is a schematic configuration diagram of a configuration example of a conveying device according to the first embodiment.
Figure 3:
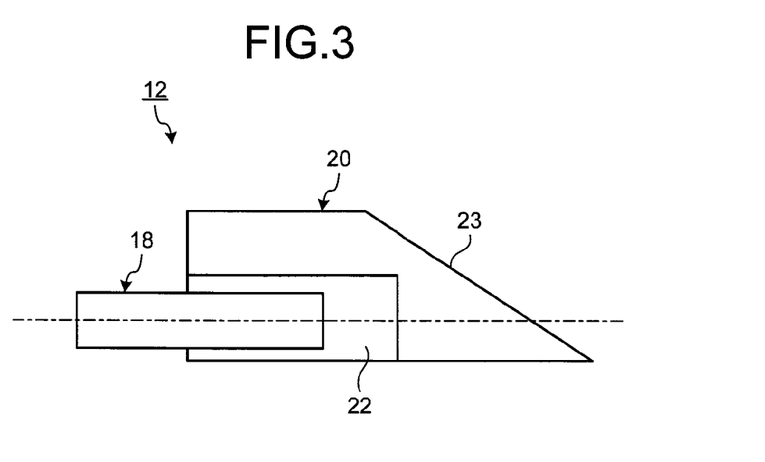
FIG. 3 is a view in the direction of arrows A-A in FIG. 2.
Figure 10:
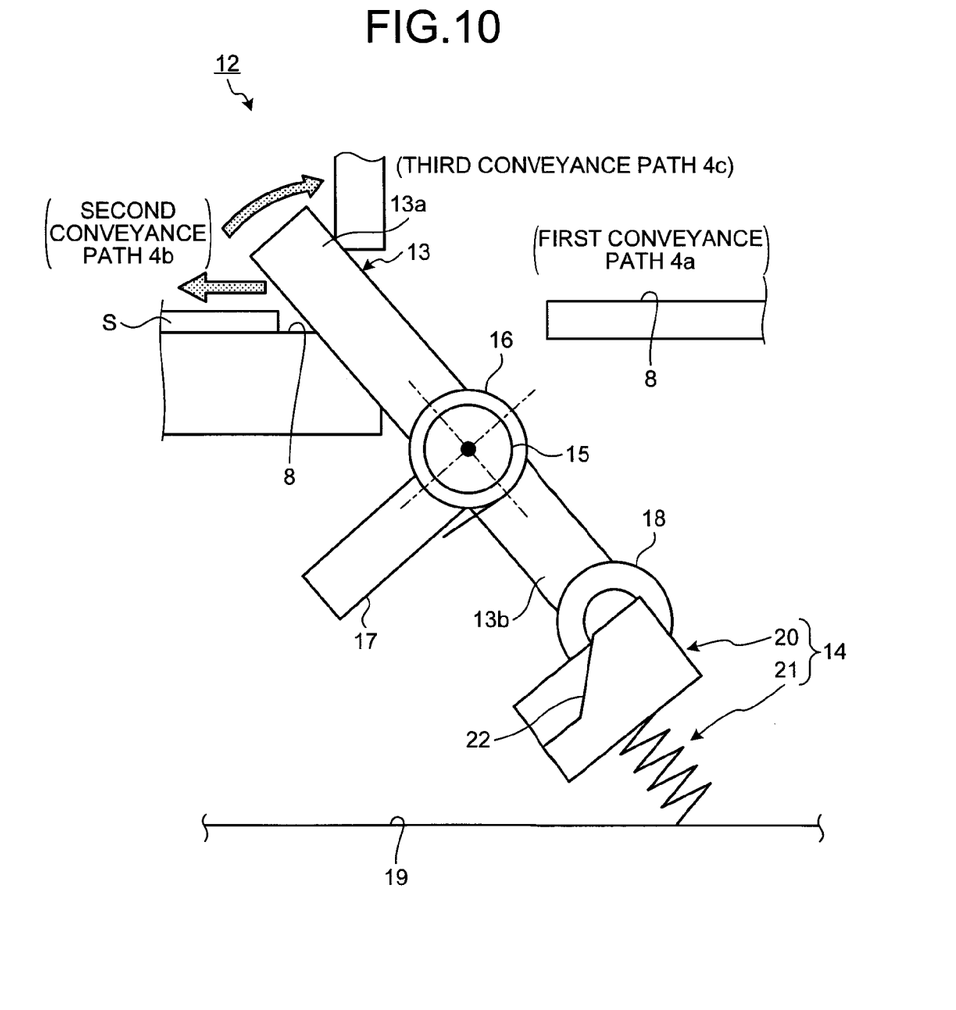
Figure 11:
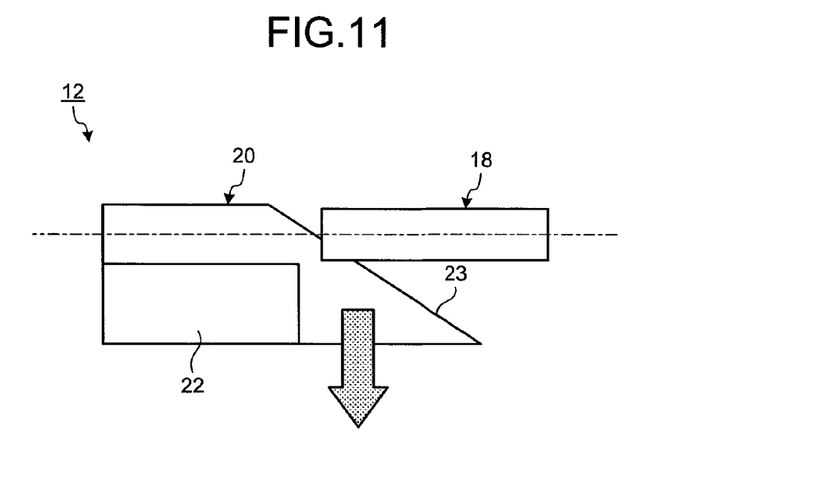
Figure 12:
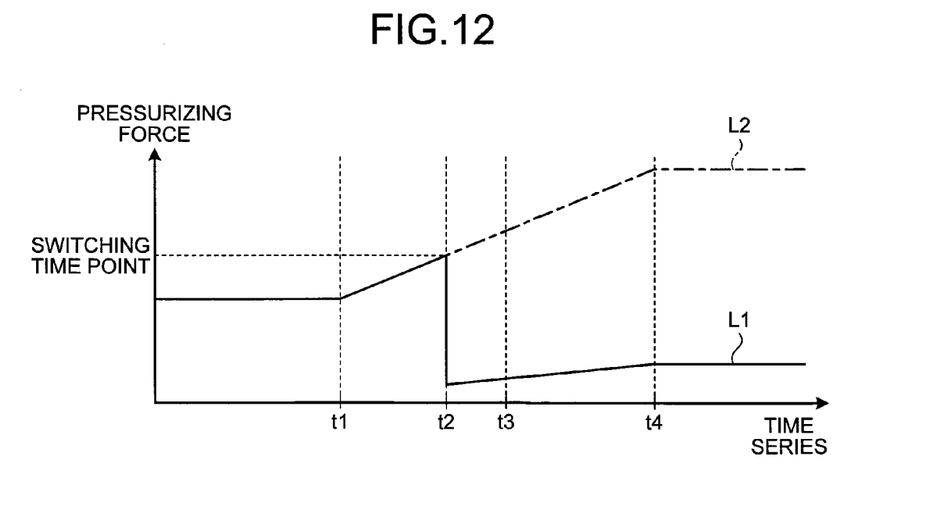
FIG. 12 is a diagram for explaining an operation of the conveying device according to the first embodiment.

FIG. 1 is a schematic configuration diagram of a configuration example of an image reading apparatus according to a first embodiment, FIG. 2 is a schematic configuration diagram of a configuration example of a conveying device according to the first embodiment, FIG. 3 is a view in the direction of arrows A-A in FIG. 2, FIGS. 4 to 11 are schematic diagrams for explaining an operation of the conveying device according to the first embodiment, and FIG. 12 is a graph for explaining an operation of the conveying device according to the first embodiment.

As depicted in FIG. 1, a conveying device 1 according to this embodiment is applied to an image reading apparatus 2 and conveys an original S, which is a sheet-like medium of a predetermined size such as a sheet of paper. The image reading apparatus 2 is applied to, for example, an image scanner, a copying machine, a facsimile, a character recognition system, or the like. The image reading apparatus 2 includes the conveying device 1 and an optical unit 3, which is a reading device, and reads by the optical unit 3 an image of the original S conveyed by the conveying device 1.

The conveying device 1 conveys the original S toward the optical unit 3, and includes a conveyance path 4, a roller 5, a driving unit 6, and a controller 7. The conveyance path 4 is a path on which the original S is conveyed. The roller 5 is provided in the conveyance path 4. The driving unit 6 is a drive source for rotating the roller 5, and constituted of a motor and the like. The controller 7 is constituted mainly of a microcomputer and controls drive of the driving unit 6. In the following explanations, the controller 7 that controls the entire image reading apparatus 2 is also used as the controller 7, but the present invention is not limited thereto.

In the conveying device 1, the driving unit 6 is driven under control of the controller 7 to transmit power to the roller 5 via a gear, a drive shaft, and the like (not depicted) to drive and rotate the roller 5. The conveying device 1 holds the original S between an outer circumferential surface of the roller 5 and an original table 8, and conveys the original S by rotation of the roller 5.

The optical unit 3 is provided in the conveyance path 4 of the original S, and reads an image of the original S conveyed by the conveying device 1. The optical unit 3 optically scans the image on the original S conveyed by a linear image sensor (a one-dimensional image sensor) in which a plurality of photoelectric conversion elements that receive light and generate electric charges are arranged in a line orthogonally to a transport direction of the original S, converts the image to an electric signal to read it as image data, and transmits the read image data to the controller 7. In the optical unit 3, the arrangement direction of the photoelectric conversion elements in the linear image sensor, that is, a longitudinal direction of the image sensor is a scanning direction, and a direction orthogonal to the scanning direction, that is, the conveyance direction of the original S is a sub-scanning direction.

In the image reading apparatus 2 configured as described above, the image on the original S conveyed by the conveying device 1 is read by the optical unit 3 per read line along the scanning direction. By the original S continuing a relative movement with respect to the image sensor of the optical unit 3, the image reading apparatus 2 sequentially reads the image along the sub-scanning direction, and is finally able to read two-dimensional image data on the original S.

The conveying device 1 includes a linear conveyance route 9 on which the original S is linearly conveyable and a bent conveyance route 10 that is branched from the linear conveyance route 9 and on which the original S is conveyable in a bent manner. The conveyance path 4 includes a first conveyance path 4a, a second conveyance path 4b, and a third conveyance path 4c. The linear conveyance route 9 includes the first conveyance path 4a and the second conveyance path 4b, and the bent conveyance route 10 includes the first conveyance path 4a and the third conveyance path 4c.

The first conveyance path 4a is a linear path with one end from which the original S is fed. The second conveyance path 4b is a linear path with a conveyance direction substantially parallel to the conveyance direction of the first conveyance path 4a, and is continuous with the first conveyance path 4a at the other end of the first conveyance path 4a. In the second conveyance path 4b, the original S is conveyed from one end on the first conveyance path 4a side and is ejected to the other end. The third conveyance path 4c is a linear path with a conveyance direction crossing the conveyance direction of the first conveyance path 4a, and is continuous with the first conveyance path 4a at the other end of the first conveyance path 4a. In the third conveyance path 4c, the original S is conveyed from one end on the first conveyance path 4a side and is ejected to the other end.

Accordingly, the linear conveyance route 9 is able to linearly convey the original S by the first conveyance path 4a and the second conveyance path 4b, and the bent conveyance route 10 is able to bend and turn the conveyance direction via a bending portion 11 with the first conveyance path 4a and the third conveyance path 4c to convey the original S. The bending portion 11 forms a part where the bent conveyance route 10 is branched from the linear conveyance route 9. The linear conveyance route 9 conveys the original S to pass the bending portion 11.

As a result, the conveying device 1 and the image reading apparatus 2 are able to save an installation space by using the bent conveyance route 10, for example, when the original S having a relatively low rigidity or a thin original S is conveyed. In the conveying device 1 and the image reading apparatus 2, when the original S is conveyed in a straight line, it is generally required to ensure an installation space for the original S to be fed and an ejection space for the original S, as a space corresponding to a length of the original S along the conveyance direction on both of the paper feeding side and paper ejecting side of the image reading apparatus 2. However, the conveying device 1 and the image reading apparatus 2 according to this embodiment is able to save the installation space worth at least the ejection space of the original S by conveying the original S using the bent conveyance route 10. Yet for example, when the original S having a relatively high rigidity or a thick original S is conveyed, the conveying device 1 and the image reading apparatus 2 are able to prevent the original S from being damaged at the bending portion 11 by using the linear conveyance route 9.

As depicted in FIG. 1, the conveying device 1 improves various things to be improved by providing at the bending portion 11a switching mechanism 12, which automatically switches between the linear conveyance route 9 and the bent conveyance route 10 by a mechanical configuration according to the original S to be conveyed, to have the linear conveyance route 9 and the bent conveyance route 10 as routes for conveying the original S, and to properly convey plural kinds of the originals S with a simple configuration.

As depicted in FIGS. 2 and 3, the switching mechanism 12 includes a guide member 13 which is a switching member, and a pressurizing mechanism 14 which is a variable pressurizing unit. The guide member 13 moves to a predetermined position correspondingly to a striking force acting on the guide member 13 from the original S, to perform switching between the linear conveyance route 9 and the bent conveyance route 10. In other words, in the switching mechanism 12, the guide member 13 detects the striking force of the original S with a simple structure and the switching mechanism 12 switches between the linear conveyance route 9 and the bent conveyance route 10 correspondingly to the detected advancing force without using a highly accurate sensor or the like. The striking force of the original S with respect to the guide member 13 corresponds to a buckling force of the original S, and is typically proportional to the cube of a thickness "t" of the original S.

The guide member 13 is provided at the bending portion 11, which is the portion where the bent conveyance route 10 is branched from the linear conveyance route 9. The guide member 13 is movable to a bent conveyance position exemplified in FIG. 2 and to a linear conveyance position exemplified in FIG. 8, depending on the striking force, which is a force that acts from the original S when the guide member 13 comes in contact with the original S. The guide member 13 guides the original S to the bent conveyance route 10 in the bent conveyance position, and the guide member 13 guides the original S to the linear conveyance route 9 in the linear conveyance position. That is, the guide member 13 in the bent conveyance position bends the original S conveyed from the first conveyance path 4a to guide the original S to the third conveyance path 4c, and the guide member 13 in the linear conveyance position guides the original S conveyed from the first conveyance path 4a to the second conveyance path 4b without bending the original S.

Specifically, the switching mechanism 12 further includes a rotation shaft 15, a first spring 16 which is a biasing unit, a stopper 17, and a contact roller 18.

The rotation shaft 15 rotatably supports the guide member 13 in a casing 19 or the like of the image reading apparatus 2. The rotation shaft 15 supports the guide member 13 rotationally movable to the bent conveyance position and the linear conveyance position.

The guide member 13 is formed rectangular-plate-shaped, and its central part is supported by the rotation shaft 15. One side of the guide member 13 forms a guiding part 13a and the other side thereof forms a resistance added part 13b with the rotation shaft 15 between the one side and other side of the guide member 13. The guiding part 13a comes in contact with a leading end of the original S in the conveyance direction conveyed from the first conveyance path 4a to guide the original S to the second conveyance path 4b or to the third conveyance path 4c, and the resistance added part 13b is a part added with a resistance from the pressurizing mechanism 14 described later.

The guide member 13 is set so that a rotation axis of the rotation shaft 15 horizontally crosses the conveyance direction of the original S, that is, to be along a width direction of the original S conveyed on the first conveyance path 4a. The guide member 13 is provided so that in the bent conveyance position an end of the guiding part 13a is positioned on the first conveyance path 4a side than the rotation shaft 15. The guide member 13 is able to rotationally move about the rotation shaft 15 into the bent conveyance position where the guiding part 13a protrudes from the original table 8 toward the first conveyance path 4a side to block the linear conveyance route 9, and into the linear conveyance position where the guiding part 13a hides from the first conveyance path 4a side to open the linear conveyance route 9.

The first spring 16 biases the guide member 13 toward the bent conveyance position, and is constituted of, for example, a torsion coil spring. The rotation shaft 15 is inserted into the first spring 16, and the first spring 16 causes a biasing force to act on the guide member 13 toward the bent conveyance position along a rotation direction. The biasing force by the first spring 16 corresponds to a restoring force for returning the guide member 13 moved from the bent conveyance position back to the bent conveyance position.

The stopper 17 is integrally rotatable with the guide member 13, and is installed upright at the central part of the guide member 13. The stopper 17 is able to position the guide member 13 biased toward the bent conveyance position to a predetermined bent conveyance position, by abutting a positioning unit, for example, a rear surface of the original table 8, while no striking force from the original S is acting on the guide member 13, to restrict rotational movement of the guide member 13. As a result, the guide member 13 is on standby in the bent conveyance position at least while no striking force from the original S is acting on the guide member 13.

The contact roller 18 is a rolling element provided at the end of the guide member 13 on the resistance added part 13b side. When the guide member 13 moves rotationally, the contact roller 18 rolls while being in contact with a resistance member 20 described later, to decrease sliding resistance.

The pressurizing mechanism 14 causes a force acting on the original S from the guide member 13 to be variable by a mechanical configuration. The pressurizing mechanism 14 makes the force acting on the original S from the guide member 13 in the linear conveyance position smaller than that the force acting on the original S from the guide member 13 in the bent conveyance position. In the following explanation, the force acting on the original S from the guide member 13 is referred to as "pressurizing force", unless otherwise specified.

Specifically, the pressurizing mechanism 14 includes the resistance member 20 and a second spring 21. The pressurizing mechanism 14 changes resistance acting on the guide member 13 from the resistance member 20 according to the position of the guide member 13, to change the pressurizing force acting on the original S from the guide member 13.

The resistance member 20 causes resistance against rotational movement, that is, a load in the rotation direction, to act on the guide member 13. The resistance member 20 abuts the contact roller 18 to indirectly provide a resistance force against the rotation direction of the guide member 13 via the contact roller 18. A first sloped surface 22 and a second sloped surface 23 are formed on an outer surface of the resistance member 20.

The first sloped surface 22 (see FIG. 2) is a surface on which the contact roller 18 rolls when the guide member 13 moves rotationally from the bent conveyance position to the linear conveyance position, and is formed in the resistance member 20 to be depressed on a top surface facing the guide member 13 and the contact roller 18. The second sloped surface 23 (see FIG. 3) is a surface that transfers the contact roller 18 toward the bent conveyance position when the guide member 13 moves rotationally from the linear conveyance position to the bent conveyance position, and is formed on a side face of the resistance member 20 to be inclined with respect to a center line of the contact roller 18, that is, a center line of a track of the contact roller 18 when the guide member 13 moves rotationally.

The second spring 21 three-dimensionally-movably supports the resistance member 20 in the casing 19. The second spring 21 supports a bottom of the resistance member 20. The second spring 21 causes a predetermined resistance (a rotational load) corresponding to the biasing force to act on the guide member 13 via the resistance member 20 and the contact roller 18.

Therefore, the pressurizing mechanism 14 is able to make the pressurizing force acting on the original S from the guide member 13 in the linear conveyance position smaller the pressurizing force acting on the original S from the guide member 13 in the bent conveyance position due to the actions of the resistance member 20 and the second spring 21. That is, in the pressurizing mechanism 14, the resistance member 20 adjusts the resistance in the rotation direction against the guide member 13 according to the biasing force of the second spring 21. The pressurizing mechanism 14 makes the resistance against rotational movement of the guide member 13 from the bent conveyance position to the linear conveyance position larger than the resistance against rotational movement of the guide member 13 from the linear conveyance position to the bent conveyance position, and causes no resistance to act on the guide member 13 in the linear conveyance position, to make the resistance against rotational movement of the guide member 13 from the linear conveyance position to the bent conveyance position smaller than the biasing force by the first spring 16.

In the conveying device 1 and the image reading apparatus 2 configured as described above, as depicted in FIGS. 2 and 3, the guide member 13 is on standby in the bent conveyance position while no striking force from the original S is acting on the guide member 13.

Figure 4:
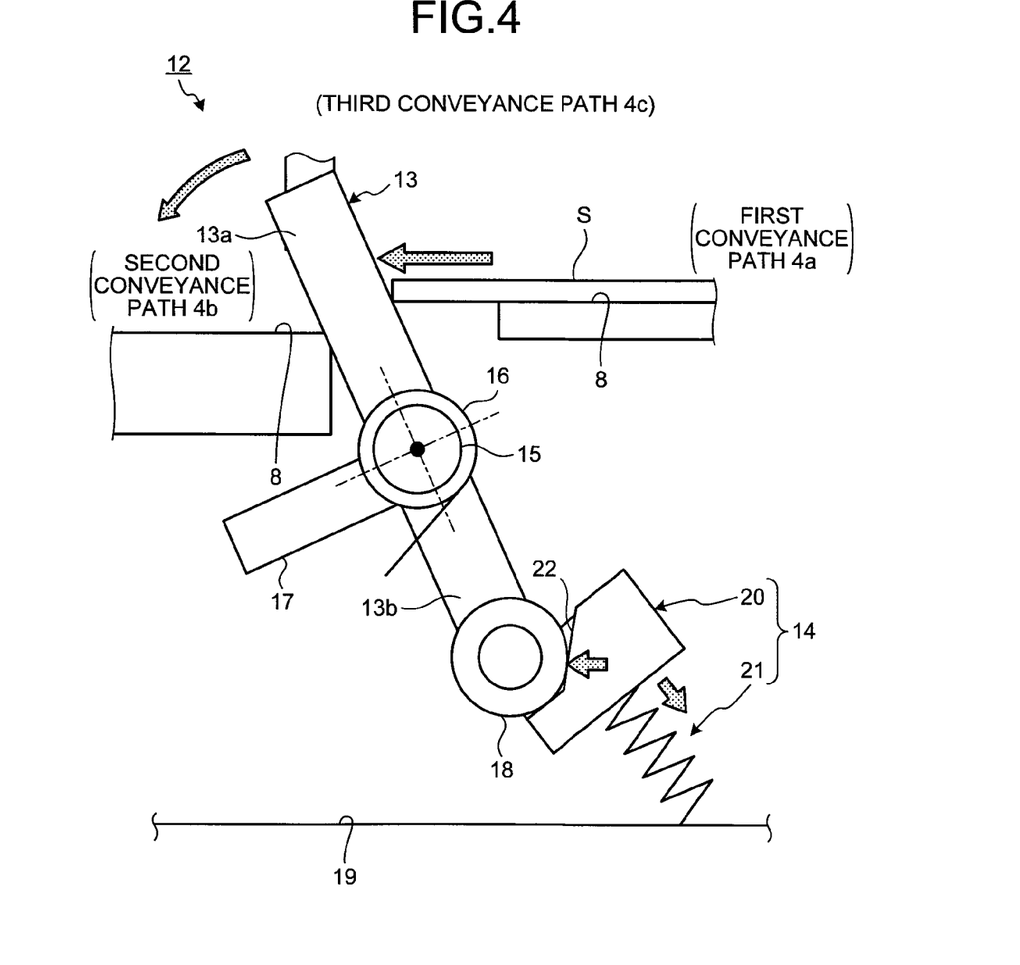
FIGS. 4 to 11 are schematic diagrams for explaining an operation of the conveying device according to the first embodiment.
Figure 5:
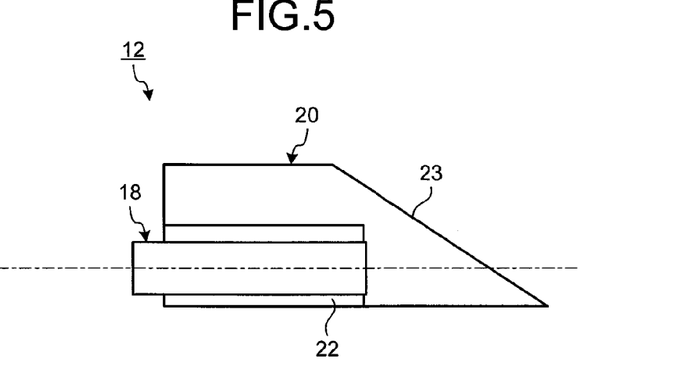

In the conveying device 1, as depicted in FIGS. 4 and 5, when the original S conveyed on the first conveyance path 4a comes in contact with the guiding part 13a of the guide member 13, the striking force, which is a force of the original S striking the guiding part 13a, acts on the guiding part 13a from the original S. At this time, in the conveying device 1, because the resistance member 20 of the pressurizing mechanism 14 comes in contact with the contact roller 18 to cause the resistance corresponding to the biasing force of the second spring 21 to act on the guide member 13, the restoring force corresponding to the biasing force of the first spring 16 and the resistance force corresponding to the biasing force of the second spring 21 applied from the resistance member 20 act on the guide member 13. Accordingly, in the conveying device 1, a predetermined force, which is a predetermined load corresponding to the restoring force by the first spring 16 and the resistance force by the second spring 21, acts on the original S from the guide member 13.

For example, when the original S coming in contact with the guiding part 13a has a relatively low rigidity or is a thin original S, and the striking force by the original S is equal to or smaller than the pressurizing force corresponding to the restoring force by the first spring 16 and the resistance force by the second spring 21, the guide member 13 is kept being held in the bent conveyance position, and buckles or bends the original S to guide the original S toward the third conveyance path 4c, which is on the bent conveyance route 10 side. That is, in the conveying device 1, when the load (the striking force) applied from the original S to the guide member 13 is equal to or smaller than the load (the pressurizing force) corresponding to the restoring force by the first spring 16 and the resistance force by the second spring 21, the guide member 13 in the bent conveyance position guides the original S toward the bent conveyance route 10 to convey the original S in a bent manner.

Figure 6:
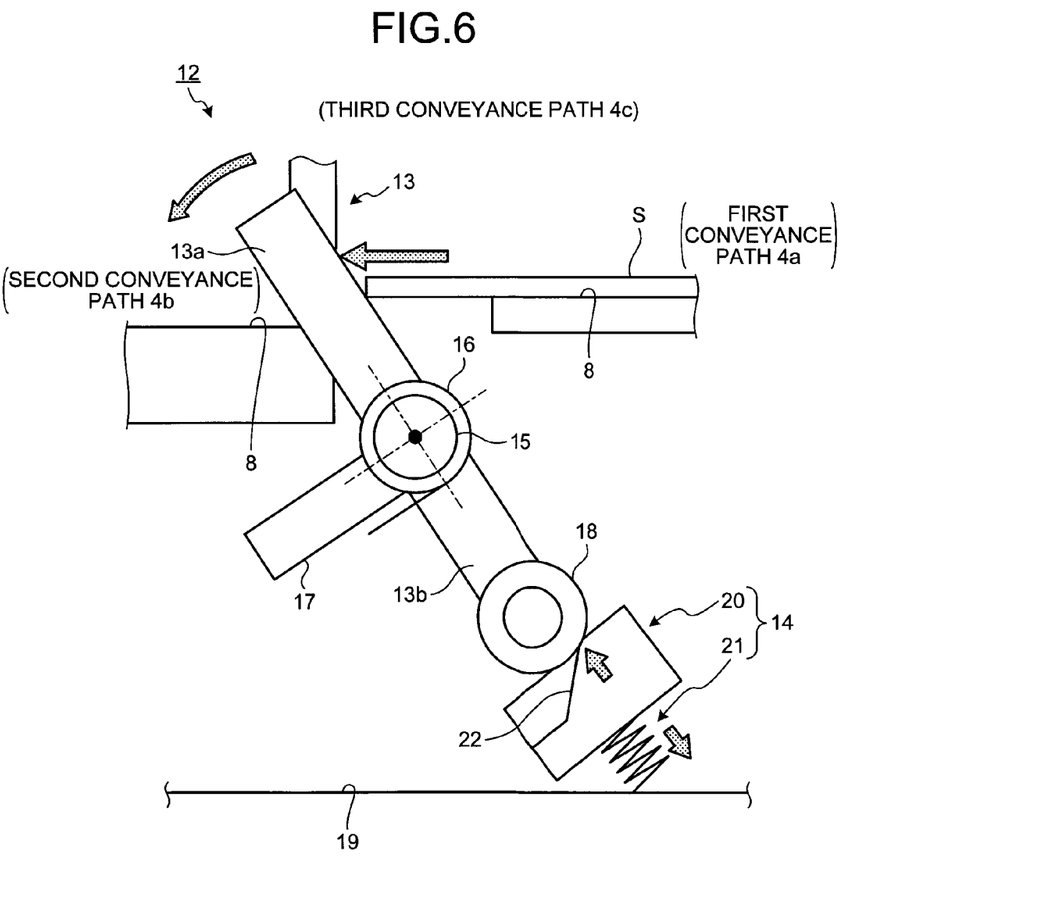
Figure 7:
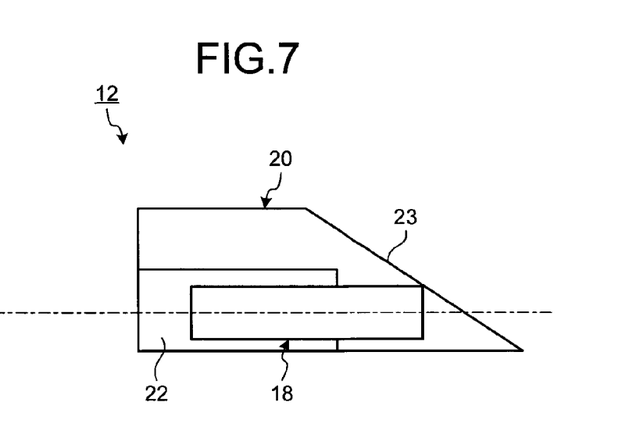
Figure 8:
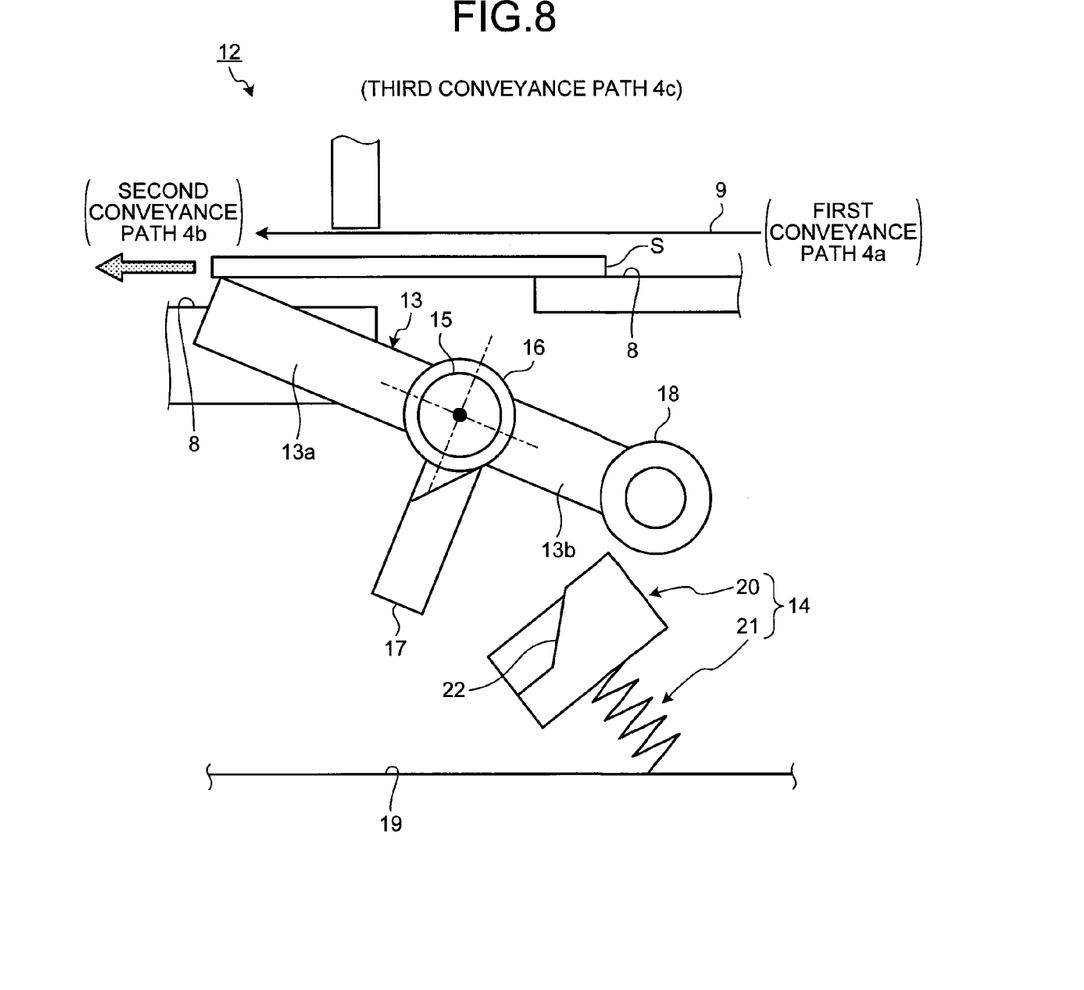
Figure 9:
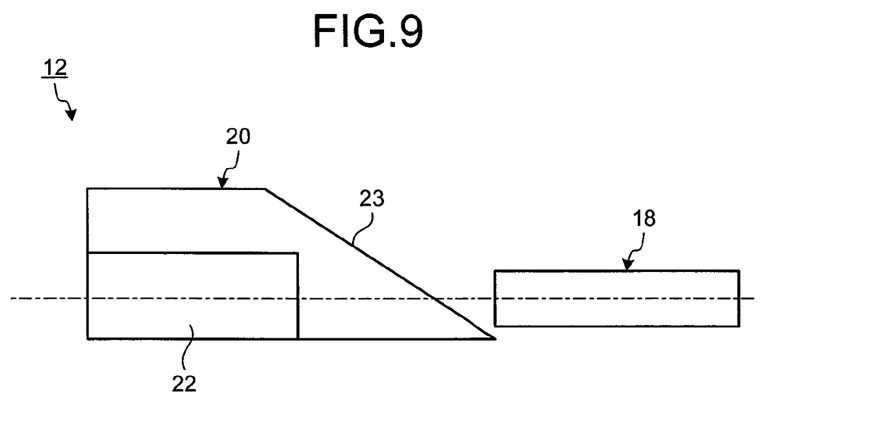

Yet for example, when the original S coming in contact with the guiding part 13a has a relatively high rigidity or is a thick original S, and the striking force by the original S is larger than the pressurizing force corresponding to the restoring force by the first spring 16 and the resistance force by the second spring 21, as depicted in FIGS. 6 and 7, the contact roller 18 rolls up the first sloped surface 22 of the resistance member 20 and climbs over the resistance member 20 while pushing and compressing the second spring 21 as the guide member 13 moves rotationally from the bent conveyance position to the linear conveyance position (moving rotationally in a counterclockwise direction in FIG. 6) to move to the linear conveyance position depicted in FIGS. 8 and 9. Accordingly, the guide member 13 guides the original S to the second conveyance path 4b on the linear conveyance route 9 side, without buckling and bending the original S. That is, in the conveying device 1, when the load (the striking force) applied from the original S to the guide member 13 is larger than the load (the pressurizing force) corresponding to the restoring force by the first spring 16 and the resistance force by the second spring 21, the guide member 13 guides the original S to the linear conveyance route 9 in the linear conveyance position to linearly convey the original S.

In the conveying device 1, when the guide member 13 is in the linear conveyance position, the resistance member 20 is spaced from the contact roller 18, the resistance force corresponding to the biasing force of the second spring 21 does not act on the guide member 13, and basically the restoring force corresponding to the biasing force of the first spring 16 acts on the guide member 13. Accordingly, in the conveying device 1, the pressurizing force corresponding to the restoring force by the first spring 16 acts on the original S from the guide member 13, that is, the pressurizing force acting on the original S from the guide member 13 in the linear conveyance position becomes smaller than the pressurizing force acting on the original S in the bent conveyance position by as much as the resistance force by the second spring 21. That is, in the conveying device 1, the pressurizing force applied from the guide member 13 to the original S is smaller when the contact roller 18 has climbed over the first sloped surface 22 and the guide member 13 is in the linear conveyance position, than during a period from when the guide member 13 is in the bent conveyance position to when the contact roller 18 has climbed over the first sloped surface 22. Accordingly, because the conveying device 1 is able to make the pressurizing force applied from the guide member 13 to the original S small when the guide member 13 is in the linear conveyance position, the conveying device 1 is able to prevent the original S from being damaged by the guide member 13, while properly guiding the original S to the linear conveyance route 9.

As depicted in FIGS. 10 and 11, in the conveying device 1, when the original S has passed a route switching portion, the guide member 13 moves rotationally from the linear conveyance position to the bent conveyance position (moves rotationally in a clockwise direction in FIG. 10) due to the restoring force (the biasing force) of the first spring 16. In the conveying device 1, the contact roller 18 continues moving rotationally to be transferred by the second sloped surface 23 of the resistance member 20 as the guide member 13 moves rotationally from the linear conveyance position to the bent conveyance position, and finally returns to the bent conveyance position depicted in FIGS. 2 and 3.

In the conveying device 1, when the guide member 13 moves rotationally, because the resistance member 20 supported by the second spring 21 escapes to a side of the contact roller 18 and the contact roller 18 is transferred by the second sloped surface 23, it is possible to decrease the resistance against rotational movement of the guide member 13 from the linear conveyance position to the bent conveyance position, without causing the biasing force of the second spring 21 to act on the guide member 13. The resistance force acting on the guide member 13 from the resistance member 20 when the guide member 13 moves rotationally from the linear conveyance position to the bent conveyance position is extremely small, and is smaller at least than the restoring force (the biasing force) by the first spring 16. Therefore, the conveying device 1 is able to return the guide member 13 to the bent conveyance position with the relatively small restoring force of the first spring 16. Accordingly, in the conveying device 1, the biasing force itself of the first spring 16 may be made relatively small, and it is possible to further suppress the pressurizing force acting on the original S from the guide member 13 in the linear conveyance position.

Furthermore, the resistance force acting on the guide member 13 from the resistance member 20 when the guide member 13 moves rotationally from the bent conveyance position to the linear conveyance position is larger than the resistance force acting on the guide member 13 from the resistance member 20 when the guide member 13 moves rotationally from the linear conveyance position to the bent conveyance position. Accordingly, the conveying device 1 is able to cause a predetermined load to act on the guide member 13 when the guide member 13 moves rotationally from the bent conveyance position to the linear conveyance position.

FIG. 12 is a diagram for comparing the conveying device 1 according to this embodiment and a conveying device 001 according to a comparative example (see FIG. 19), where a horizontal axis represents a time series and a vertical axis represents a force acting on the original S from the guide member 13 (a pressurizing force). In this figure, a solid line L1 denotes the conveying device 1 according to this embodiment, and a one-dot chain line L2 denotes the conveying device 001 according to the comparative example. In the figure, a time point t1 denotes a time point at which the original S strikes the guide member 13, a time point t2 denotes a time point at which the contact roller 18 has climbed over the resistance member 20, a time point t3 denotes a certain time point in mid course of the guide member 13 being switched from the bent conveyance position to the linear conveyance position, and a time point t4 denotes a time point at which the guide member 13 has been completely switched into the linear conveyance position.

Figure 19:
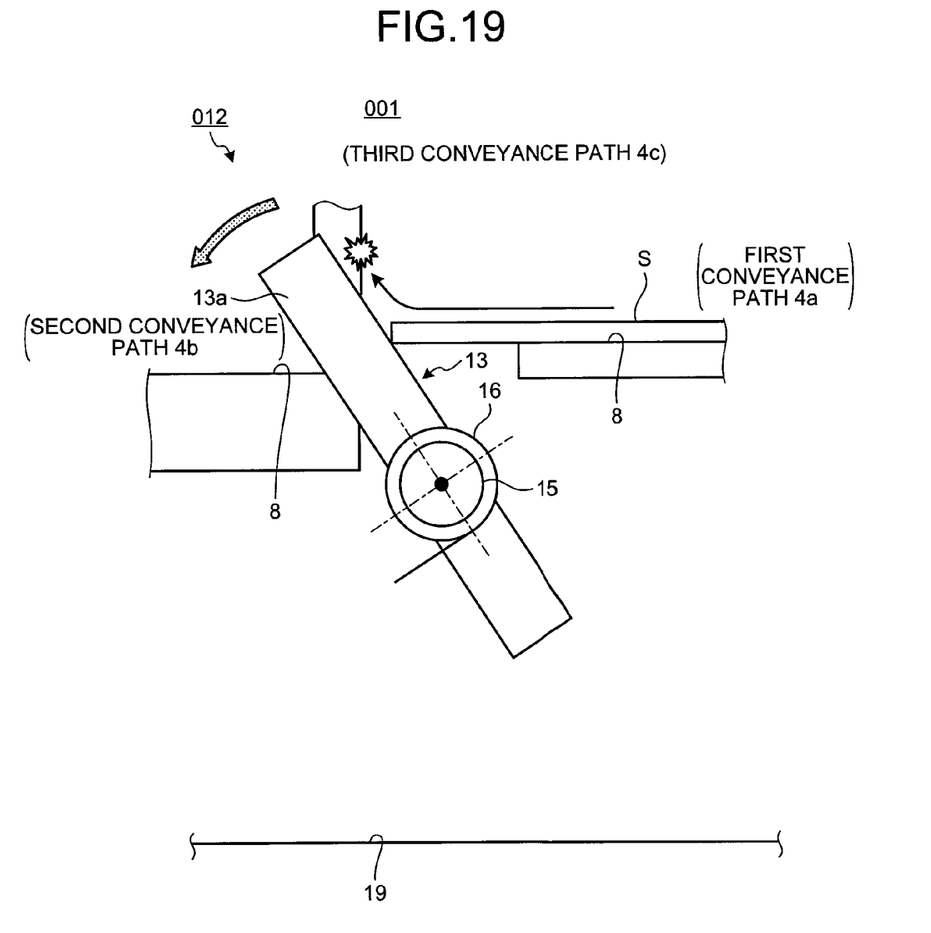
FIG. 19 is a diagram for explaining a conveying device according to a comparative example.

As exemplified in FIG. 19, a switching mechanism 012 of the conveying device 001 according to the comparative example does not include the pressurizing mechanism 14 and is configured such that only the biasing force of the first spring 16 acts on the original S as the pressurizing force. To guide to the bent conveyance route 10 the original S of predetermined thickness, which does not have any problem even if it is conveyed in a bent manner, a force to hold the guide member 13 in the bent conveyance position is required until the striking force of a predetermined size acts. In the switching mechanism 012, this force needs to be provided only by the biasing force of the first spring 16. As a result, in the switching mechanism 012, as illustrated by the one-dot chain line L2 in FIG. 12, a certain large force continuously acts on the original S from the guide member 13 at and after the time point t1. In the switching mechanism 012, at the time of switching between bent transport and linear transport, for example, at the certain time point t3 in mid course of the guide member 13 being switched from the bent conveyance position to the linear conveyance position, the guide member 13 may stop at an intermediate position between the bent conveyance position and the linear conveyance position. Therefore, switching between the bent transport and linear transport may not be performed infallibly. Accordingly, in the switching mechanism 012, if the guide member 13 stops at the intermediate position between the bent conveyance position and the linear conveyance position, the original S, for example, may come in contact with a wall surface of the third conveyance path 4c.

In contrast, in the switching mechanism 12 of the conveying device 1 according to this embodiment, as indicated by the solid line L1 in FIG. 12, the pressurizing mechanism 14 holds the guide member 13 in the bent conveyance position until the striking force (a load) acting on the guide member 13 from the original S becomes large to some extent, and when the striking force becomes larger than a predetermined level and once the contact roller 18 has climbed over the resistance member 20 at the time point t2, the force acting on the original S from the guide member 13 thereafter basically becomes only the restoring force by the first spring 16 and relatively small. As a result, in the switching mechanism 12, at the time of switching between the bent conveyance position and the linear conveyance position, even at the certain time point t3 in mid course of the guide member 13 being switched from the bent conveyance position to the linear conveyance position, for example, it is possible to prevent the guide member 13 from stopping at an intermediate position between the bent conveyance position and the linear conveyance position, and to perform switching between the bent transport and linear transport infallibly. Accordingly, in the switching mechanism 12, for example, it is possible to prevent the original S from coming in contact S with the wall surface of the third conveyance path 4c.

The conveying device 1 according to the above described embodiment of the present invention includes the linear conveyance route 9 on which the sheet-like original S is linearly conveyable, the bent conveyance route 10 branched from the linear conveyance route 9 and on which the original S is conveyable in a bent manner, the guide member 13 provided at the branched portion and movable to the bent conveyance position in which the original S is guided to the bent conveyance route 10 and to the linear conveyance position in which the original S is guided to the linear conveyance route 9, according to the force acting from the original S at the time of contacting the original S, and the pressurizing mechanism 14 that makes the force acting on the original S from the guide member 13 in the linear conveyance position smaller than the force acting on the original S from the guide member 13 in the bent conveyance position.

The image reading apparatus 2 according to the above-described embodiment of the present invention includes the conveying device 1, and the optical unit 3 that reads an image of the original S conveyed by the conveying device 1.

Therefore, the conveying device 1 and the image reading apparatus 2 are able to perform the switching between the linear conveyance route 9 and the bent conveyance route 10 with a simple structure, and to prevent the original S from being damaged at the route switching portion, thereby enabling to properly convey plural kinds of the originals S.

Further, in the conveying device 1 and the image reading apparatus 2, because an apparatus size and a motor size of the driving unit 6 are limited when downsizing the apparatus, for example, a size of a conveying force of the original S that is able to be generated is also limited. If the original S having a relatively high rigidity or a thick original S is conveyed in a bent manner, a bending load is generated and the conveying force may not be sufficient, and thus the original S may not be conveyable or elongation of the image may occur. However, in the conveying device 1 and the image reading apparatus 2, because the striking force corresponding to the buckling force of the original S, which affects the bending load, is mechanically detected by the guide member 13 to switch between the linear conveyance route 9 and the bent conveyance route 10, it is possible to perform bent conveyance via the bent conveyance route 10 stably, and maintain good quality of the read image. Further, in the conveying device 1 and the image reading apparatus 2, because the linear conveyance route 9 and the bent conveyance route 10 are switched automatically according to the type (thickness or rigidity) of the original S, it is possible to not require any manual operation by a user and thus improve operability.

Further, in the conveying device 1 and the image reading apparatus 2, the striking force buckling force) of the original S proportional to the cube of the thickness "t" of the original S is mechanically detected by the guide member 13 without using a highly accurate sensor such as an ultrasonic, optical, or pressure-sensitive sensor for detecting the thickness or the like of the original S, to switch between the linear conveyance route 9 and the bent conveyance route 10. Therefore, it is also possible to reduce the manufacturing cost using a relatively cheap resin and a spring for components such as the guide member 13 and the pressurizing mechanism 14, while covering some variation in the detection.

Figure 13:
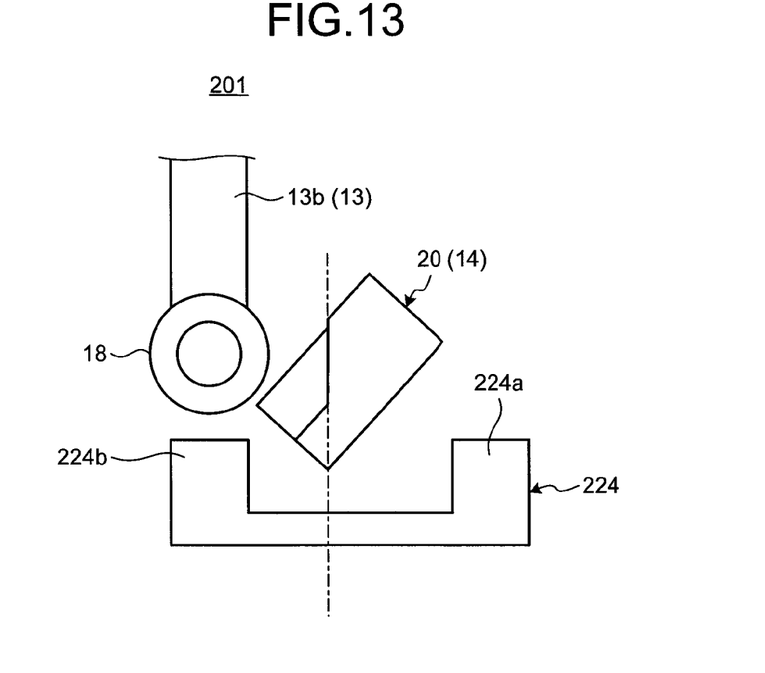
FIG. 13 is a schematic configuration diagram of a configuration example of a conveying device according to a second embodiment.
Figure 14:
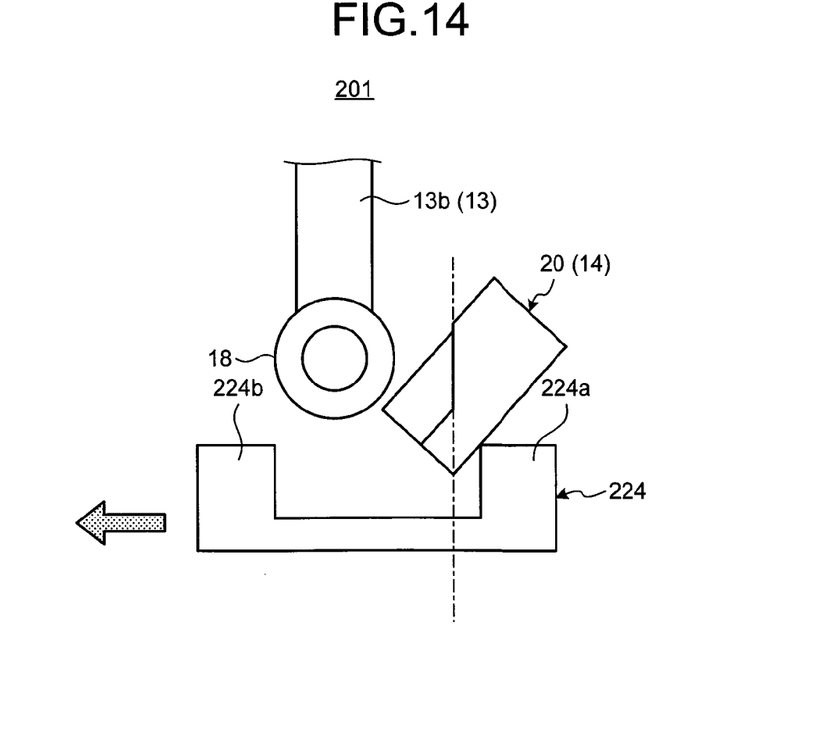
FIGS. 14 and 15 are schematic diagrams for explaining an operation of the conveying device according to the second embodiment.
Figure 15:
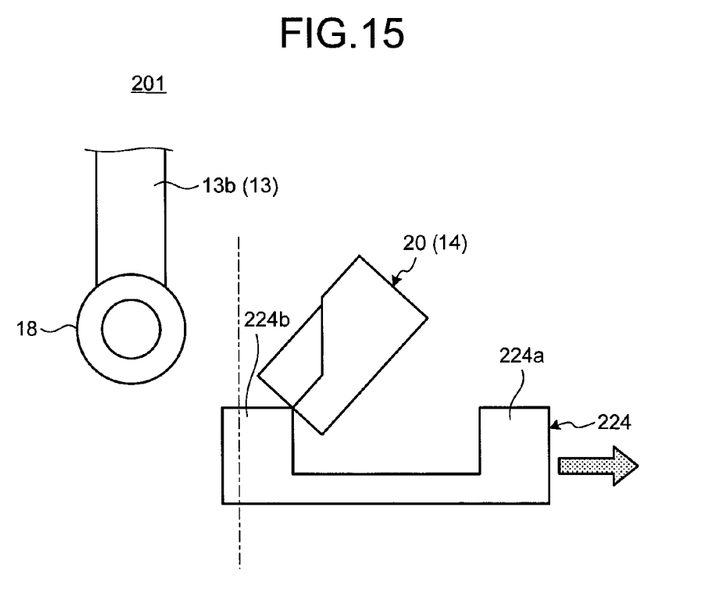

FIG. 13 is a schematic configuration diagram of a configuration example of a conveying device according to a second embodiment of the present invention, and FIGS. 14 and 15 are schematic diagrams for explaining an operation of the conveying device according to the second embodiment. The conveying device according to the second embodiment is different from the conveying device according to the first embodiment in that it includes a fixing unit. As for other things like structures, operations, and effects that are common to the above embodiment, redundant descriptions will be omitted as much as possible, and denoted by the same reference numerals (this also applies to the following other embodiments).

A conveying device 201 according to the second embodiment includes, as depicted in FIG. 13, a fixing member 224 as the fixing unit. The fixing member 224 is able to fix the guide member 13 into either of the bent conveyance position or the linear conveyance position, regardless of the force acting on the guide member 13 from the original S. The fixing member 224 according to the second embodiment is explained as indirectly fixing the guide member 13 into one of the bent conveyance position and the linear conveyance position by fixing the resistance member 20 of the pressurizing mechanism 14 to a predetermined position. However, not being limited to this explanation, the guide member 13 may be directly fixed.

The fixing member 224 is for canceling the automatic switchover between the linear conveyance route 9 and the bent conveyance route 10, and includes two protrusions 224a and 224b. The fixing member 224 is movable to an automatic switchover position depicted in FIG. 13, a bent fixed position depicted in FIG. 14, and a linear fixed position depicted in FIG. 15.

At the automatic switchover position depicted in FIG. 13, neither of the protrusions 224a and 224b of the fixing member 224 contact the resistance member 20. Accordingly, in the conveying device 201, the guide member 13 is movable to the bent conveyance position and the linear conveyance position as in the conveying device 1 according to the first embodiment, and the conveying device 201 is able to perform the automatic switchover between the linear conveyance route 9 and the bent conveyance route 10.

In the bent fixed position depicted in FIG. 14, the protrusion 224a of the fixing member 224 comes in contact with the bottom of the resistance member 20 in the bent conveyance position of the guide member 13 to restrict movement of the resistance member 20. Accordingly, in the conveying device 201, the resistance member 20 functions as a restriction member that restricts rotational movement of the guide member 13 from the bent conveyance position to the linear conveyance position, and is able to restrict the rotational movement of the guide member 13 to the linear conveyance position. Therefore, in the conveying device 201, the conveyance route of the original S is fixed to the bent conveyance route 10, and all the originals S are conveyed through the bent conveyance route 10.

At the linear fixed position depicted in FIG. 15, the protrusion 224b of the fixing member 224 abuts a side face of the resistance member 20 to cause the resistance member 20 to retract from the contact roller 18, while pushing and compressing the second spring 21 (see FIG. 2 and the like). Accordingly, in the conveying device 201, the resistance member 20 is spaced from the contact roller 18, and the resistance force due to the biasing force of the second spring 21 does not act on the guide member 13. Therefore, in the conveying device 201, the guide member 13 always moves to the linear conveyance position when the original S comes in contact with the guide member 13, and all the originals S are conveyed through the linear conveyance route 9.

The conveying device 201 according to the above-described second embodiment includes the fixing member 224 that is able to fix the guide member 13 into the bent conveyance position or the linear conveyance position, regardless of the force acting on the guide member 13 from the original S. Therefore, in the conveying device 201, it is possible to arbitrarily select among a mode for automatically switching between the linear conveyance route 9 and the bent conveyance route 10, a mode for fixing to the linear conveyance route 9, and a mode for fixing to the bent conveyance route 10, by a user operating the fixing member 224. For example, when the mode for fixing to the linear conveyance route 9 is selected, the conveying device 201 is able to infallibly prevent the original S from being damaged or curled by conveying the original S in a bent manner, and for example, when plural types of the originals S are continuously conveyed, it is possible to always convey the originals S to the same paper ejection position. For example, when the mode for fixing to the bent conveyance route 10 is selected, the conveying device 201 is able to always convey the original S to the paper ejection position on the bent conveyance route 10 side if for example there is an obstacle at the paper ejection position of the linear conveyance route 9.

Figure 16:
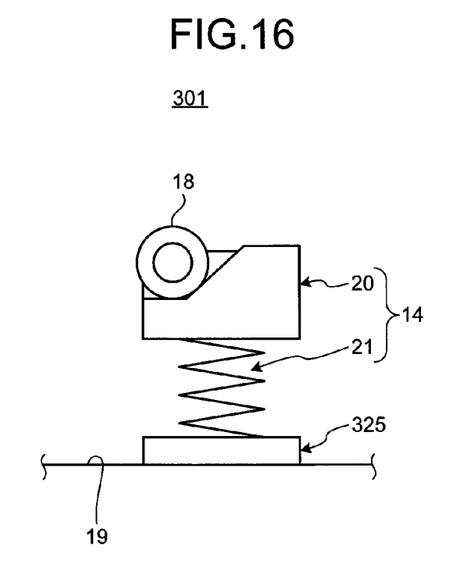
FIG. 16 is a schematic configuration diagram of a configuration example of a conveying device according to a third embodiment.
Figure 17:
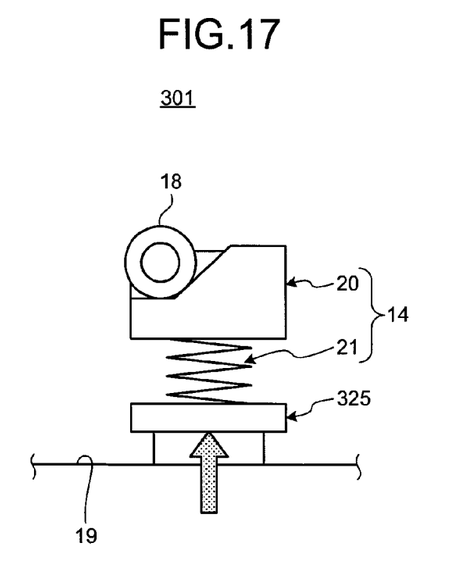
FIG. 17 is a schematic diagram for explaining an operation of the conveying device according to the third embodiment.

FIG. 16 is a schematic configuration diagram of a configuration example of a conveying device according to a third embodiment of the present invention, and FIG. 17 is a schematic diagram for explaining an operation of the conveying device according to the third embodiment. The conveying device according to the third embodiment is different from the conveying device according to the first embodiment in that it includes an adjusting unit.

As depicted in FIG. 16, a conveying device 301 according to the third embodiment includes an adjusting mechanism 325 as the adjusting unit. The adjusting mechanism 325 is able to adjust a force acting on the original S from the guide member 13 (a pressurizing force). As depicted in FIG. 17, the adjusting mechanism 325 according to the third embodiment changes a position of the second spring 21 to adjust the biasing force by the second spring 21, and thus is able to adjust the force acting on the original S from the guide member 13.

The conveying device 301 according to the third embodiment includes the adjusting mechanism 325 that is able to adjust the force acting on the original S from the guide member 13. Therefore, the conveying device 301 is able to arbitrarily change a boundary between the thicknesses or rigidities of the original S to be conveyed in a bent manner and the original S to be linearly conveyed. For example, in the conveying device 301, it is possible to adjust the variation in the biasing force of the second spring 21 and a manufacturing error in each part of the pressurizing mechanism 14 at the time of factory shipments.

Figure 18:
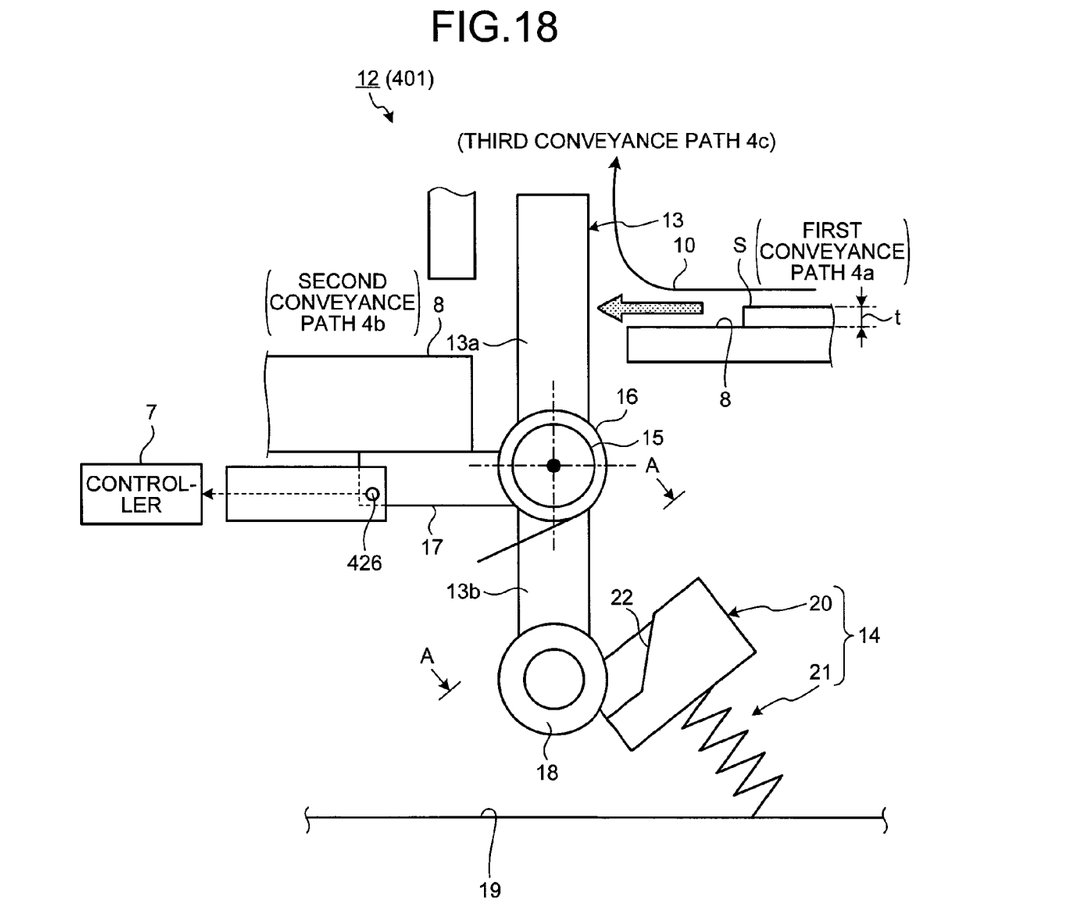
FIG. 18 is a schematic configuration diagram of a configuration example of a conveying device according to a fourth embodiment.

FIG. 18 is a schematic configuration diagram of a configuration example of a conveying device according to a fourth embodiment of the present invention. The conveying device according to the fourth embodiment is different from the conveying device according to the first embodiment in that it includes a detecting unit.

As depicted in FIG. 18, a conveying device 401 according to the fourth embodiment includes a position sensor 426 as the detecting unit. The position sensor 426 is able to detect a position of the guide member 13, and transmits a result of the detection to the controller 7. The position sensor 426 according to the fourth embodiment is an ON/OFF sensor provided at a position where the stopper 17 is detectable when the guide member 13 is in the bent conveyance position. When the guide member 13 is in the bent conveyance position, the position sensor 426 detects the stopper 17 and transmits an ON signal to the controller 7, and when the guide member 13 is in the linear conveyance position, the position sensor 426 transmits an OFF signal to the controller 7. Because the position sensor 426 is for simply detecting ON and OFF, a highly accurate sensor is not required.

The controller 7 changes a mode of control correspondingly to the position of the guide member 13 detected by the position sensor 426. For example, the controller 7 executes control to change a conveyance mode of the original S according to the position of the guide member 13 detected by the position sensor 426. When the position sensor 426 detects the stopper 17, that is, the position sensor 426 detects that the guide member 13 is in the bent conveyance position, the controller 7 conveys the original S in a first mode. When the position sensor 426 does not detect the stopper 17, that is, detects that the guide member 13 is in the linear conveyance position, the controller 7 conveys the original S in a second mode.

For example, in the first mode of conveyance performed in the bent conveyance of the original S, the controller 7 increases an output torque of a motor of the driving unit 6 by decreasing the conveying speed of the original S, as compared with the second mode of conveyance performed in the linear conveyance of the original S, to increase the conveying force. Accordingly, the conveying device 401 is able to enlarge an acceptable range of the bending load. As long as the supplied electric current is the same, decreasing a rotation speed (≈ conveying speed) of the motor of the driving unit 6 increases the output torque.

The controller 7 may for example execute control to change an image read mode of the original S according to the position of the guide member 13 detected by the position sensor 426. The controller 7 reads an image of the original S in a first mode when the position sensor 426 detects that the guide member 13 is in the bent conveyance position. The controller 7 reads the image of the original S in a second mode when the position sensor 426 detects that the guide member 13 is in the linear conveyance position.

The controller 7 may, for example, perform image correction in view of the fact that elongation of image (variation in magnification) occurs due to increase in conveyance load worth the bending load in the first mode of image reading performed in the bent transport of the original S, as compared with the second mode of image reading in the linear transport of the original S.

The conveying device 401 according to the above-described fourth embodiment of the present invention includes the position sensor 426 that is able to detect the position of the guide member 13 and the controller 7 that changes the controlling mode according to the position of the guide member 13 detected by the position sensor 426. Therefore, the conveying device 401 is able to perform optimum control depending on each of the bent transport and the linear transport.

The conveying device and the imaging reading apparatus according to the above-described embodiments of the present invention are not limited to those described above, and various modifications may be made within the scope of the appended claims. The conveying device and the imaging reading apparatus according to the above embodiments of the present invention may be configured by combining any of these embodiments.

According to the conveying device and the imaging reading apparatus of the present invention, it is possible to convey plural kinds of media properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conveying device, comprising:
a linear conveyance route on which a sheet-like medium is linearly conveyable;
a bent conveyance route that is branched from the linear conveyance route and on which the medium is conveyable in a bent manner;
a switching member provided at the branched portion and movable into a bent conveyance position for guiding the medium to the bent conveyance route and into a linear conveyance position for guiding the medium to the linear conveyance route, according to a force acting from the medium at a time of coming in contact with the medium; and
a variable pressurizing unit configured to make a force acting on the medium from the switching member in the linear conveyance position smaller than a force acting on the medium from the switching member in the bent conveyance position.

2. The conveying device according to claim 1, further comprising:
a rotation shaft configured to support the switching member rotationally-movably into the bent conveyance position and into the linear conveyance position; and
a biasing unit that biases the switching member into the bent conveyance position, wherein
the variable pressurizing unit includes a resistance member configured to cause resistance against the rotational movement to act on the switching member,
the resistance member makes resistance against the rotational movement of the switching member from the bent conveyance position to the linear conveyance position larger than resistance against the rotational movement of the switching member from the linear conveyance position to the bent conveyance position, and
in the linear conveyance position, the resistance member does not cause the resistance to act on the switching member, and makes the resistance against the rotational movement of the switching member from the linear conveyance position to the bent conveyance position smaller than a biasing force by the biasing member.

3. The conveying device according to claim 1, further comprising a fixing unit configured to fix the switching member in the bent conveyance position or in the linear conveyance position, regardless of the force acting on the switching member from the medium.

4. The conveying device according to claim 1, further comprising an adjusting unit configured to adjust the force acting on the medium from the switching member.

5. The conveying device according to claim 1, further comprising:
a detecting unit configured to detect a position of the switching member; and
a control unit configured to change a mode of control according to the position of the switching member detected by the detecting unit.

6. An image reading apparatus, comprising:
the conveying device according to claim 1; and
a reading device configured to read an image on the medium conveyed by the conveying device.

* * * * *